United States Patent Office 3,444,996
Patented May 20, 1969

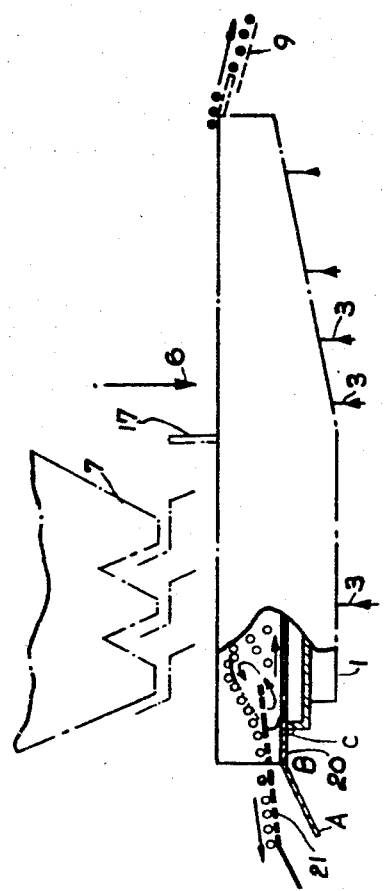

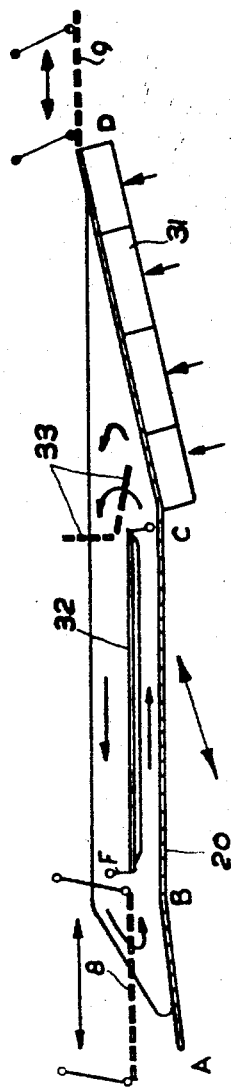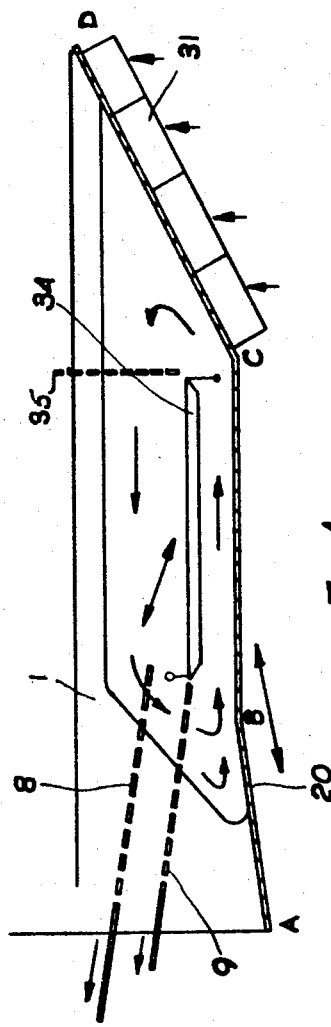

3,444,996
DRY SEPARATION OF MIXTURES OF SOLID MATERIALS
Edward Douglas and Terence Walsh, Stevenage, England, assignors to National Research Development Corporation, London, England
Filed Mar. 13, 1967, Ser. No. 622,641
Claims priority, application Great Britain, Mar. 14, 1966, 11,067/66
Int. Cl. B07b 3/04
U.S. Cl. 209—44                                                          10 Claims

ABSTRACT OF THE DISCLOSURE

Improved methods and apparatus for separating dry mixtures of solids of different densities using the float-and-sink principle of separation in which instead of a liquid separating medium a solid separating medium in particulate form fluidised by the introduction of low pressure air or other gaseous material into a mass of such medium is employed to effect separation within the mass and vibration of the mass and/or cycling of separating medium from and to the mass is utilized to cause the separated fractions to follow different paths towards spaced outlets.

---

The present invention relates to methods of and apparatus for dry separation of solid mixtures of materials of different densities.

According to one aspect of the invention there is provided a "float" and "sink" method of dry separation of a mixture of pieces of materials of different densities which comprises forming a fluidised bed of separating material with an effective density lying between the densities of the materials to be separated, feeding the mixture to be separated to the bed, separately discharging from the bed the lighter, "float," products and heavier, "sink," products of the separation, and causing the separating material to move along the bottom of the bed in the direction opposite to that of discharge of "float" products.

According to another aspect of the invention there is provided apparatus for carrying out such method comprising a channel-shaped container with a base of which part at least is porous, part at least of said base being upwardly inclined relative to the horizontal, means for causing movement of the "sink" products of separation along the base in the direction to cause these products to move up the incline, and respective discharge points for "float" products and for "sink" products at opposite ends of the bed.

The various features and advantages of the invention will be apparent from the following description of apparatus for putting the invention into effect taken with the accompanying drawings of which:

FIGURE 2 is a diagrammatic view of a modified form of the apparatus of FIGURE 1, showing only the left hand end in detail, FIGURE 3 is a diagrammatic view of a further modified version of the apparatus of FIGURE 2, and FIGURE 4 is a diagrammatic view of a modified version of the apparatus of FIGURE 3.

Figure 1:
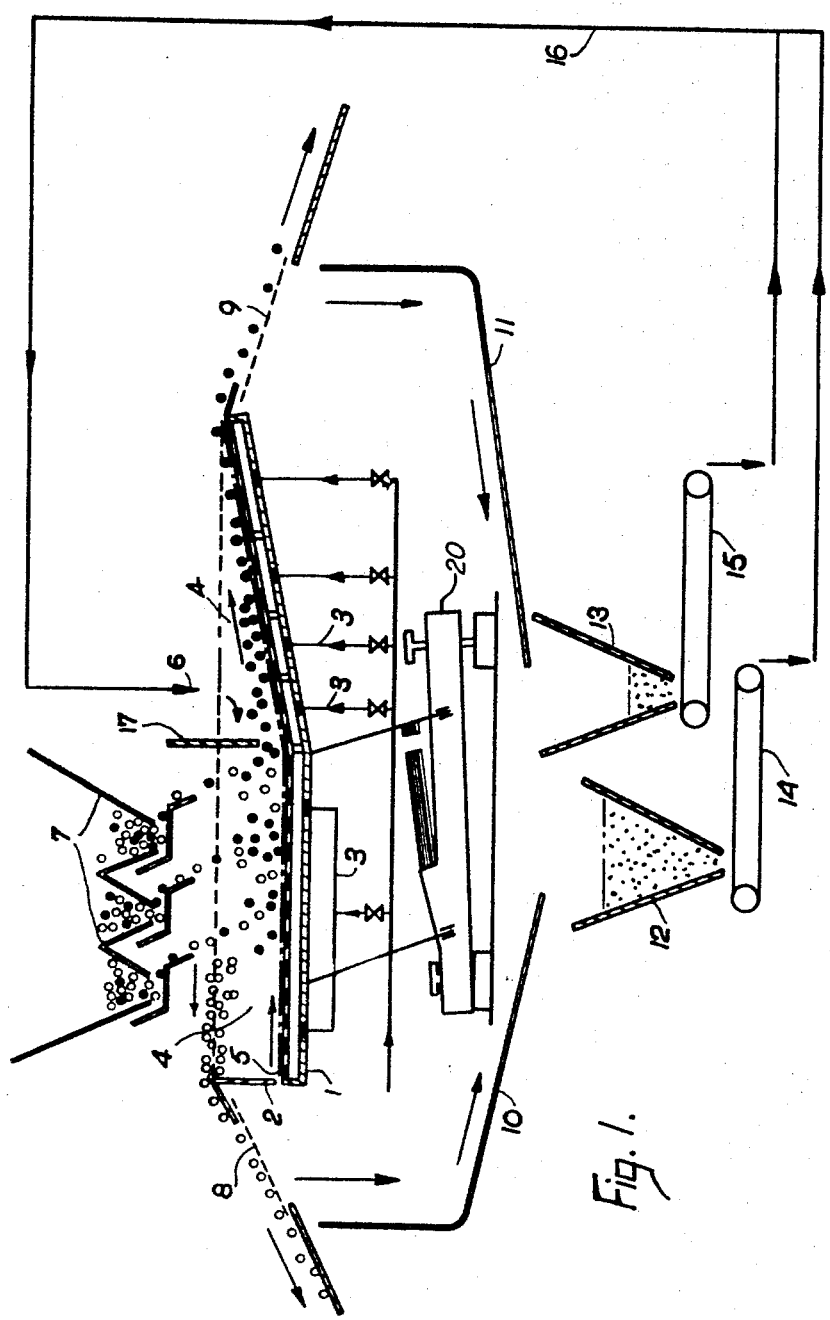
FIGURE 1 is a diagrammatic representation of an example of such apparatus.

The apparatus shown in FIGURE 1 comprises a container or tank having a base 1 which is horizontal over part of its length and is then inclined upwardly to a level slightly above the upper level of the tank weir 2 at the end opposite to such inclined end. The base 1 is perforated and low pressure pipes 3 are connected to the perforations for the introduction of a gaseous fluidizing medium, such as air, for example, into the tank.

Spaced slightly above the base 1 is a porous deck 5, the spacing between the base and deck being divided into compartments each receiving a supply of low pressure air from a pipe 3'. A bed 4 of sized granular material constituting the separating medium is formed on the deck 5 and is fluidized by the air passing through the porous deck so as to have an effective density lying between the densities of the material to be separated.

The whole of the apparatus, or at least the deck 5, is vibrated by suitable vibrator means 20 in such a manner that mterial lying on the deck 5 has imparted to it movement in the direction of the arrows toward the right hand end of the apparatus as shown in FIGURE 1.

As an alternative to vibrating the apparatus, or the deck 5 to produce movement of the material on the deck, such movement may be effected by scrapers functioning in known manner.

Arranged above the inclined portion of the deck 5 is an outlet, indicated schematically by arrow 6, of a controlled feed arrangement for re-introducing separating medium to the bed to replace that removed in operation, and above the uniform depth portion of the bed is arranged a feed arrangement 7 for the material to be separated.

The feed arrangement may be a single hopper with three outlets, as shown, or may comprise two or more hoppers with any number of outlets.

A separating screen 8 is arranged adjacent the weir 2 to separate separating medium from the mixture fraction delivered at that end and a similar screen 9 for the same purpose is provided at the other end of the bed. In the form of apparatus illustrated in FIGURE 1 the two screens 8 and 9 co-operate with individual chutes 10 and 11 to return separating medium to individual hoppers 12 and 13 as will later be explained. The outlet ends of the hoppers 12 and 13 are connected through an appropriate elevating arrangement indicated by the line 16 to the medium feed arrangement outlet 6 the control of the feed being effected by individually regulatable belt type feeding conveyors 14 and 15 disposed beneath the hoppers 12 and 13.

In operation of the arrangement above described the material to be separated is fed by the arrangement 7 into the uniform depth section of the fluidized bed and by virtue of the selected density of the medium of the bed, the lighter fraction of the mixture introduced floats to the surface of the bed and the heavier fraction sinks on to the deck 5.

If the bed is initially formed so that when fluidized its upper level is flush with the end wall 2, the introduction of additional material from 7 causes the bed to overflow over weir 2 and the floating fraction, together with some of the bed medium, is caused to flow over weir 2 on to screen 8 which separates the overflowing medium from the floating fraction and returns the medium to hopper 12, the floating fraction being delivered off the screen 8. The heavier fraction on the deck 5 is moved in the direction from left to right by the vibratory motion of deck, and is thus elevated to the opposite end of the bed 4. It is then delivered on to screen 9 which serves to separate from it the separation medium delivered with it, such medium being returned by chutes 11 to hopper 13. To replace the medium removed from the bed at either end, the feed arrangement 14, 15, 16, 6 operates to return medium from the hoppers 12 and 13 at a regulated rate while separation continues.

The positioning of the outlet 6 of the medium feed arrangement in relation to the weir 2 ensures that there is a flow of separating medium from the former towards the latter to entrain the floating fraction and assist its delivery over weir 2.

A baffle screen 17 may be interposed between the outlet 6 and the feed arrangement 7 conveniently at the junction of the horizontal and inclined portions of the base 1 and projecting into the bed 4 to prevent the floating fraction from moving towards the right hand end of the bed.

For some separations it has been found satisfactory to omit the horizontal portion of the base and have a continuously sloping base 1.

The separating medium may be a simple homogenous granular material of the appropriate density but may also be a mixture of two such granular materials of different characteristics. In this latter case a degree of adjustment of the effective density of the bed can be achieved by varying the relative speeds of operation of the conveyors 14 and 15 to vary the relative proportions of the two constituents of the separation medium. When this type of medium is employed the lighter constituent of the medium tends to rise and overflow with the floating fraction of the mixture to be separated while the heavier constituent of the medium tends to be removed with the sinking fraction of the mixture to be separated. These lighter and heavier constituents of the medium are returned to the hoppers 12 and 13 respectively, individual hoppers being desirable to maintain accurate control of the medium mixture returned to the bed.

Referring now to FIGURE 2 there is shown a modified form of the apparatus of FIGURE 1, only the left hand end of the apparatus being shown in detail as the remainder is the same as in FIGURE 1.

The modification comprises principally the provision of a non-porous end section 20 of the deck 5 and the removal of the weir 2 so that the tank is open at this end. The end section 20 is horizontal between points B and C and downwardly inclined between points B and A. An independently vibrated screen 21 designed to transport from right to left is arranged at this end of the bed and projects slightly into the end surface of the bed material. It has been found that by vibrating the deck 5 at a frequency close to the mechanical resonance frequency of the deck with its load of bed material, whilst fluidizing all but the left hand end portion of the bed 4, a mass of the bed material forms itself into an artificial "weir" at the left hand end of the bed. There is a constant circulation of the material of this mass in an anticlockwise direction, as indicated by the curved arrows, and such circulation constantly feeds any material lying on the solid portion 20 of the deck back into the bed in the direction B to C. It also entrains the floating fraction of the material to be separated and moves it over the artificial weir on to the screen 21. Any separating medium which leaves the bed with such floating fraction falls through the screen 21 on to the solid portion 20 of the deck 5 and is automatically fed back into the bed. There is thus no need for the chute 10 of the arrangement of FIGURE 1 in the modified arrangement of FIGURE 2.

That part of the separating medium which is removed from the bed 4 with the heavier fraction of the material to be separated at the right hand end of the bed can conveniently be returned to the bed, not as in FIGURE 1, but by collecting it immediately beneath the screen 9 and returning it to the solid portion 20 of the deck 5 beneath screen 21 from whence it will be automatically fed back into the bed.

The apparatus shown in FIGURE 1 can conveniently be further modified by simplification of the separating medium return feed arrangements in the following manner. The separating medium from the screen 9 at the right hand end of the bed is guided by a chute (not shown) towards the left hand end to mix with the separating medium from the screen 8 and it is then fed on to an inclined chute attached to the side wall of the tank. By virtue of its attachment to the wall of the tank, the inclined chute is vibrated with such tank and the medium is caused to move up the inclined chute to the level of the top of the side wall of the tank. From this point the medium can fall back into the bed, preferably at the same location as the outlet 6 of FIGURE 1.

In a practical example of the apparatus described above, incorporating the modification of FIGURE 2, it was found possible to achieve a separation throughput of several tons per hour with a bed depth of 2 inches, using a conventional vibrator arrangement of ¼ horsepower vibrating the deck 5 at a frequency of approximately 50 cycles per second.

Referring to FIGURE 3, the apparatus diagrammatically illustrated employs the same artificial "weir" principle as the apparatus of FIGURE 2 but differs therefrom in that the non-porous end section 20 forms part of the support base of the tank 1 instead of forming part of a deck 5 above such base as in FIGURES 1 and 2; the part BC of this non-porous end section 20 extends over the whole horizontally disposed part of the tank base; and the arrangements 31 for introducing low pressure air to fluidise the separating material are confined to the upwardly inclined section CD of the tank 1. Spaced above the part BC of the end section 20 but within the thickness of the bed are one or more fluidizing pads 32 which are attached to the side walls of the tank 1 at a suitable inclination so as to be vibrated with the tank 1. At the end of the fluidizing pad 32 adjacent the inclined portion CD, is disposed an L-section seive baffle 33 of such a mesh as to permit the passage of fluidized separating material through it but to prevent both the "sink" and "float" fractions of the mixture passing through it. The screens 8 and 9 at opposite ends of the tank 1 are arranged to be vibrated to assist in the respective fractions of the mixture.

With the arrangement of FIGURE 3, the non-fluidized separation material beneath the pad 32 is positively transported towards the right i.e. in the direction B to C as indicated by the arrow beneath the pad 32. The "sink" fraction of the mixture passes on to the top of the pad 32 and, because the pad 32 vibrates with the tank, is fed to the right in the drawing; it falls below the baffle 33 on to the incline CD up which it is fed to the vibrating screen 9. At and beyond point C this material becomes fluidized by the operation of the fluidizing arrangement 31 thereby providing a hydraulic potential causing a flow of fluidized material over the top surface of pad 32 towards the artificial "weir" at the left hand end of the tank 1. The rate of this flow and consequently the rate of transport of the "float" fraction of the mixture to the left hand end of the tank, can be controlled in a number of different ways. Thus, for example, the height of the pad 32 above the section 20 may be varied. With increased height more non-fluidized material is accommodated beneath the pad and transported towards point C thereby increasing the rate of flow across the upper surface of pad 32 towards the "weir." Alternatively a flow control flap could be fitted at E or F or at both E and F.

Referring now to FIGURE 4, the arrangement shown is generally similar to that of FIGURE 3 except that the two screens 8 and 9 are now located both at the "weir" end of tank 1 and the pad 32 is replaced by a trough 34 having a porous base for fluidizing purposes and arranged to be vibrated independently of the tank 1. The inclined section CD of the trough is shown inclined at a steeper angle than in FIGURE 3 and selection of this angle is dictated by such considerations as reduction of wave effects in the fluidized bed. The main tank 1 is vibrated to feed to the right i.e. from A to C and the trough 34 is vibrated to feed to the left i.e. towards the "weir." The screens 8 and 9 are disposed to project into the "weir" at different levels correspondin gto points at which the "sink" and "float" fractions of the mixture are fed to the weir the "sink" fraction being fed by the vibration of trough 34. As with the arrangement of FIGURE 3 the separating material is caused to circulate in respectively fluidized and non-fluidized form above and below the trough 34 but in the arrangement of FIGURE 4 both "float' and "sink" fractions are intercepted at the "weir." The right hand end of trough 34 is enclosed by a wire mesh 35 which extends out of the bed to prevent overspill of mixture introduced into the trough at this end. The fluidizing arrangements 31 function in the same manner as in the apparatus of FIGURE 3 to provide the hydraulic potential causing circulation of the separating material.

As with the apparatus of FIGURE 3, the rate of flow above the trough 34 can be regulated by varying the height of trough 34 above the base of tank 1 or by the provision of flow control flaps at an appropriate point or points.

We claim:

1. Apparatus for the dry separation of a mixture of pieces of material of different densities by means of a fluidised bed of separating medium having an effective density lying between the densities of the materials to be separated, which apparatus comprises, in combination:
    (a) trough means for containing the bed, said trough means having a partly porous base support, part of said base support at one end thereof being non-porous,
    (b) at least one gas chamber associated with the porous part of the base support for feeding gas through the said porous part for fluidising separating medium to form a fluidised bed on the porous part of the base support,
    (c) screening means above said non-porous end part of the base support, said screening means being arranged to be positioned within the end of the fluidised bed and to discharge "float" products of the separation, said screening means being adapted to return to the bed any separating medium carried with the discharged "float" products,
    (d) means for feeding a mixture for separation to the part of the bed which is fluidised in operation,
    (e) means for vibrating the base support so as to cause materials on said support to be moved in the direction opposite to that of discharge of "float" products,
    (f) means for discharging "sink" products of the separation, and
    (g) means for making good any loss from the bed of separating medium entrained with said "sink" products.

2. Apparatus for the dry separation of a mixture of pieces of materials of different densities by means of a fluidised bed of separating medium having an effective density lying between the densities of the materials to be separated, which apparatus comprises, in combination:
    (a) trough means for containing the bed, said trough means having a partly porous base support, part of said base support at one end thereof being non-porous.
    (b) a porous support spaced above a portion of said non-porous part of the base support,
    (c) at least one gas chamber associated with the porous part of said base support and at least one gas chamber associated with said porous support spaced above the base support, said gas chambers serving to introduce gas through the pores of the supports for the purpose of fluidising separating medium to form a fluidised bed on the porous part of the base support and on the additional support,
    (d) screening means above the other portion of the non-porous part of the base support, said screening means being arranged to be positioned within the end of the fluidised bed and to discharge "float" products of the separation while returning to the bed any separating medium carried with the discharged "float" products,
    (e) means for vibrating the base support so as to cause materials on said support to move in the direction opposite to that of discharge of "float" products,
    (f) means for discharging "sink" products of the separation, and
    (g) means for making good any loss from the bed of separating medium entrained with said "sink" products.

3. Apparatus as claimed in claim 2, comprising vibrating means for said additional supports, said additional vibrating means being adapted to cause movement of "sink" products to discharge at the same end of the bed as "float" products.

4. A "float" and "sink" method of dry separation of a mixture of pieces of materials of different densities which comprises forming a bed of solid particulate separating material having a uniform depth over a first portion thereof and a depth over the remaining portion thereof which decreases progressively toward one edge of said bed, fluidizing said first portion of the bed with gas under pressure whereby the separating material of the first portion of the bed presents an effective density lying between the densities of the materials to be separated, feeding the mixture to be separated to the bed, producing a path of circulation of separating material of said first portion of the bed along the bottom of said first portion of the bed in one direction and across the top of said first portion of the bed in the direction opposite to said one direction, and separately discharging from said bed the lighter "float" products and heavier "sink" products of the separation.

5. A method of dry separation of materials as claimed in claim 4 wherein "sink" products are caused to move along the bottom of the first portion of the bed in said one direction towards said remaining portion of said bed, and the base of said remaining portion of the bed is vibrated in such a manner as to return said "sink" products into the body of the first portion of the bed, both the "sink" products and the "float" products being arranged to be discharged from the bed at the edge thereof opposite to said one edge.

6. Apparatus for the dry separation of a mixture of materials of different densities by the "float" and "sink" separation process, said apparatus comprising a channel shaped container which is open at one end and has a base which extends horizontally from said open end over a first portion of the container and is upwardly inclined relative to the horizontal over a second portion terminating at the end of said container opposite to said open end, means for introducing gas under pressure into said container to fluidize at least a portion of the contents thereof, means for vibrating said base to cause movement of the sink products of separation along the base in a direction to cause these products to move up the inclined portion thereof, and spaced apart discharge means for "float" products and for "sink" products.

7. Apparatus as claimed in claim 6 wherein said horizontal portion of said base has a part which is porous, and part which is non-porous, and the upwardly sloping portion of said base is also porous, and wherein said gas introducing means is arranged to introduce gas through the porous part of the bed, said apparatus including fluidizing means arranged above part at least of the said non-porous part of the base.

8. Apparatus as claimed in claim 6 including a weir member disposed at said open end of said container to constitute the discharge means for said "float" product, said weir member incompletely closing said open end of the container.

9. Apparatus as claimed in claim 6 including first vibrating means connected to vibrate the horizontally extending portion of the base in a manner to cause said movement of said sink products, and second vibrating means connected to vibrate said upwardly sloping portion of said base in such a manner as to cause said sink products to be redirected back towards said open end of said container, and wherein said discharge means are vertically spaced at said open end of said container.

10. A "float" and "sink" method of dry separation of a mixture of pieces of material of different densities which comprises forming a fluidized bed of separating medium having an effective density dying between the densities of the materials to be separated, feeding the mixture to the bed, and separately discharging from the bed the "float" products and "sink" products of the separation while preventing fluidization of the bed at the end from which "float" products are discharged so as to cause said separating medium to form an obstruction in the form of a circulating mass for the fluidized bed.

References Cited

UNITED STATES PATENTS

| 2,040,196 | 5/1936 | Berrisford | 209—467 |
| 2,303,367 | 12/1942 | Kendall et al. | 209—466 X |
| 2,310,894 | 2/1943 | Brusset | 209—467 |
| 2,348,344 | 5/1944 | Holmes | 209—467 |
| 2,427,423 | 9/1947 | Shawcross | 209—467 |
| 2,903,132 | 9/1959 | Berry | 209—468 X |
| 3,367,501 | 2/1968 | Eveson | 209—493 X |

FOREIGN PATENTS 1,361,346   4/1964   France.

TIM R. MILES, *Primary Examiner.*

U.S. Cl. X.R.

209—466, 467